CONVENTIONAL T.R.L. SYSTEM

INVENTORS: E. L. SELEY
R. C. STONE, JR.
BY Lucian C Canepa
ATTORNEY

INVENTORS: E. L. SELEY
R. C. STONE, JR.
BY Lucian C. Canepa
ATTORNEY

United States Patent Office 3,048,716

Patented Aug. 7, 1962

3,048,716

LOGIC SYSTEM INCLUDING HIGH FAN-OUT STAGE HAVING VARIABLE CLAMPING MEANS

Eldon L. Seley, Berkeley Heights, and Richard C. Stone, Jr., Chatham Township, Morris County, N.J., assignors to Bell Telephone Laboratories, Incorporated, New York, N.Y., a corporation of New York Filed Aug. 31, 1960, Ser. No. 53,304

3 Claims. (Cl. 307—88.5)

Figure 1:
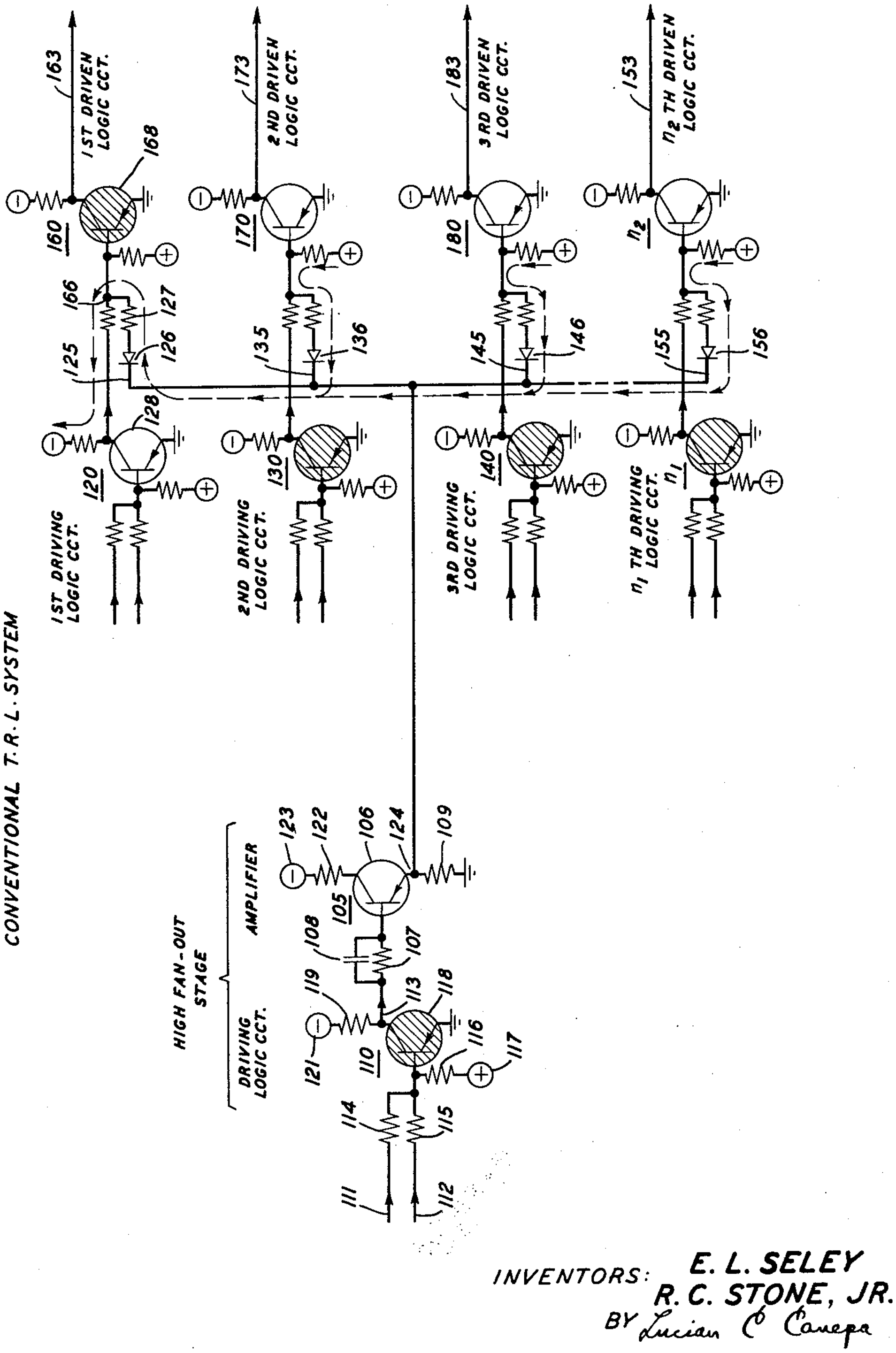

This invention relates to the processing of digital information, and more particularly to transistor resistor logic systems.

Typical of the logic technologies from which the circuitry of a digital information processing system may be constructed its transistor resistor logic or TRL, which includes a basic logic circuit or building block comprising a transistor and a plurality of resistors.

Whenever a relatively large number of TRL circuits is to be controlled by a single driving TRL circuit, it is necessary, in order to insure sufficient drive to and proper operation of the controlled or driven circuits, that an amplifier be interposed between the driving and the driven circuits. Moreover, in those TRL systems in which each of the circuits driven by such an amplifier is also driven by at least one other driving logic circuit, it is necessary that each of the output paths emanating from the amplifier include an isolating diode. These isolating diodes prevent undesired interactions among the driven logic circuits, which interactions might, for example, cause a driven circuit to be turned off at a time when it was intended that it be on.

Furthermore, a typical driving amplifier of a TRL system of the aforementioned type includes an output impedance element whose value is a function of the number of circuits actually driven by the amplifier. Hence, as the number of circuits driven by the amplifier is varied, the value of the impedance element must, in order to insure a proper level of conduction in each of the driven circuits, also be varied.

An object of the present invention is the improvement of logic systems.

More specifically, an object of this invention is the provision of a reliable and economical TRL system which includes a driving amplifier whose output paths do not require isolating diodes and whose output impedance element need not be changed in value as the number of circuits driven by the amplifier varies.

These and other objects of the present invention are realized in a specific illustrative embodiment thereof which includes a driving emitter-follower amplifier that is coupled to a plurality of driven logic circuits each of which is also driven by at least one other driving circuit. Connected to the amplifier is a variable clamping circuit which maintains the output terminal of the amplifier slightly negative with respect to ground during the time that the amplifier is nonconducting, which is when interaction currents tend to flow among the driven logic circuits. This slightly negative potential acts as a sink for the interaction currents that would otherwise flow among the driven logic circuits. Since the interaction currents are in this manner diverted to the variable clamping circuit, the need for isolating diodes in the output paths of the amplifier is eliminated.

The potential at the output terminal of the amplifier must, when the amplifier conducts, go more negative than the aforementioned slightly negative clamp voltage. This more negative excursion is allowed to take place by automatically disconnecting the clamping circuit from the output terminal during the time in which the amplifier conducts.

The automatic disconnection of the clamping circuit stems from the fact that the clamping circuit includes a transistor whose inputs are the same as those to the logic circuit which drives the amplifier. Thus, whenever the logic circuit which drives the amplifier is turned off, thereby turning the amplifier on, the transistor of the clamping circuit is also turned off, thereby disabling the clamping circuit.

Also connected to the output terminal of the driving amplifier is a device which, only when the amplifier is turned on, clamps the output terminal thereof at a predetermined negative potential which is chosen to be of a value to cause a preselected level of conduction in each of the driven circuits. The output voltage of the amplifier is in this manner clamped at the predetermined voltage irrespective of the number of circuits actually driven thereby. Accordingly, no component of such an amplifier need be changed as the number of circuits driven by the amplifier is varied.

Thus, a TRL system made in accordance with the principles of the present invention neither requires isolating diodes in the output paths emanating from the driving amplifier thereof nor requires that the configuration of the amplifier be changed as the number of circuits driven thereby is varied. These improvements are achieved by a circuit which, only during the time in which the amplifier does not conduct, clamps the output terminal thereof at a slightly negative potential that is sufficient to prevent the flow of interaction currents among the driven circuits but which is insufficient to drive those circuits into conduction, and by a device which, only during the time in which the amplifier conducts, clamps the output terminal thereof at a negative potential whose values causes a preselected level of conduction in each of the driven circuits.

It is a feature of the present invention that a transistor resistor logic system include a driving amplifier whose output terminal is connected to a variable clamping circuit and to a clamping device, the circuit being effective only during the time in which the amplifier does not conduct and the device performing a clamping function only during the time in which the amplifier conducts.

It is another feature of this invention that a transistor resistor logic system include a logic circuit driving an amplifier, that the output terminal of the amplifier be connected to a variable clamping circuit, that the clamping circuit and the logic circuit each have the same configuration and the same input signals applied thereto, whereby the need for isolating diodes in the amplifier output paths is obviated, and that a device be connected to the amplifier output terminal for clamping the voltage thereof only during the time in which the amplifier conducts, whereby the need is obviated for changing the configuration of the amplifier as the number of circuits driven thereby varies.

Figure 2:
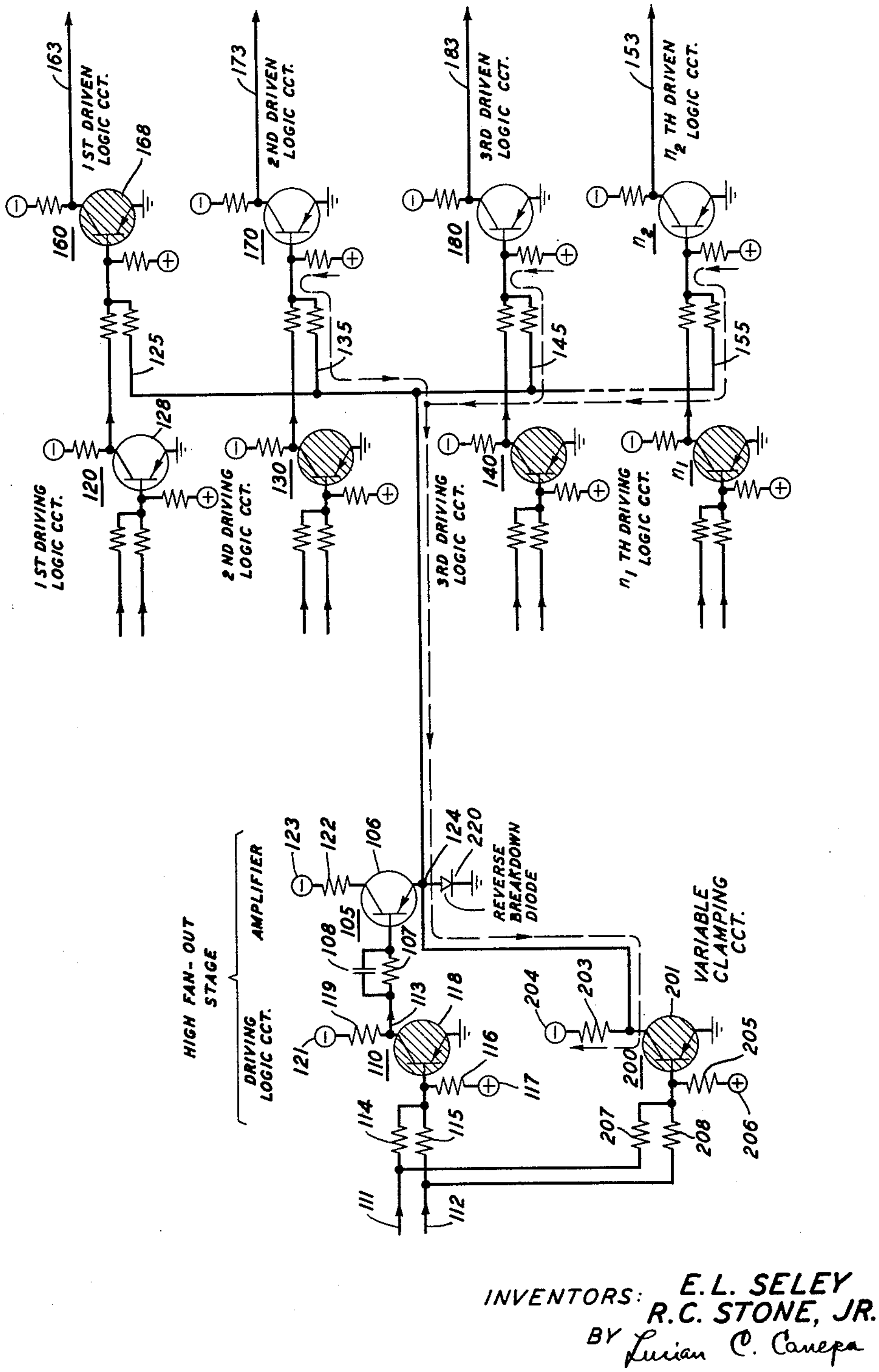

A complete understanding of the above and other features and advantages thereof may be gained from a consideration of the following detailed description of an illustrative embodiment thereof presented hereinbelow in connection with the accompanying drawing, in which:

FIG. 1 is a circuit diagram of a conventional TRL system comprising an emitter-follower amplifier each of whose output paths includes an isolating diode and whose configuration must be changed as the number of circuits driven thereby varies; and FIG. 2 is a circuit diagram of a specific illustrative TRL system made in accordance with the principles of the present invention.

Referring now to FIG. 1, there is shown a conventional TRL system comprising an emitter-follower amplifier 105 and a plurality of identical logic circuits 110, 120, 130, 140 . . . $n_1$, 160, 170, 180 . . . $n_2$. The logic circuit 110, for example, includes two leads 111 and 112 to which may be coupled input signals, whereby there is produced on lead 113 an output signal that is a logical function of the input signals. The circuit 110 also includes input resistors 114 and 115, a base bias resistor 116, a positive source 117 of direct-current power, a p-n-p transistor 118, a collector bias resistor 119, and a negative source 121 of direct-current power.

If a voltage at or near ground potential is assumed to represent the binary value "1" and if a relatively high voltage is designated "0," the logic circuit 110 performs the function of providing on the lead 113 a "1" signal if a "0" signal is applied to one or both of the input leads 111 and 112. On the other hand, a "0" signal appears on the output lead 113 only if each of the input leads 111 and 112 has a "1" signal coupled thereto. Such a configuration is the basic TRL building block and is commonly referred to as an AND-NOT circuit.

Whenever a relatively large number of logic circuits is to be controlled by the logic circuit 110, it is necessary, in order to insure sufficient drive to and proper operation of the controlled or driven circuits, that an amplifier be interposed between the driving and the driven circuits. Thus, as shown in FIG. 1, the amplifier 105 is interposed between the driving logic circuit 110 and the plurality of driven logic circuits 160, 170, 180 . . . $n_2$.

The amplifier 105 includes a transistor 106 whose base electrode is coupled through a resistor 107 and a capacitor 108 to the output lead 113 of the logic circuit 110 of FIG. 1. The amplifier 105 also includes an emitter resistor or ouput impedance element 109, a collector-bias resistor 122, a negative source 123 of direct-current power, and an output terminal 124.

Whenever the transistor 118 of the driving logic circuit 110 is in its conducting condition, represented by parallel diagonal lines within the transistor symbol, the potential of the output lead 113 with respect to ground is relatively low, viz., the collector-to-emitter voltage drop of the transistor 118, which low potential, as specified above, is indicative of a "1" signal. This low potential is insufficient to turn on the transistor 106 of the noninverting amplifier 105, whereby the potential of the amplifier output terminal 124 with respect to ground is zero, which is indicative of a "1" signal.

On the other hand, whenever the transistor 118 of the driving logic circuit 110 is in its nonconducting condition, the potential of the output lead 113 with respect to ground is a relatively high negative voltage representative of a "0" signal, and the source 121 and the resistors 119 and 107 then provide sufficient base drive to the transistor 106 to saturate it, whereby a current flows through the emitter resistor 109 to make the amplifier output terminal 124 sufficiently negative with respect to ground to represent a "0" signal and to drive all of the logic circuits 160, 170, 180 . . . $n_2$ into conduction.

It is noted that the term "fan-out" is commonly employed to specify the number of logic circuits driven by a driving logic circuit, and that the term "fan-in" is commonly employed to specify the number of inputs to a given logic circuit. Thus, for example, to indicate that a driving circuit has a fan-out of, say 10, is to specify that the circuit is coupled to 10 driven circuits. In accordance with this terminology and the assumption made hereinabove that the amplifier 105 is coupled to a relatively large number of driven logic circuits 160, 170, 180 . . . $n_2$, the combination of the driving logic circuit 110 and the amplifier 105 may be termed a high fan-out stage, and is so designated in FIGS. 1 and 2.

Connected to the output terminal 124 of the emitter-follower amplifier 105 of the high fan-out stage shown in FIG. 1 are a plurality of output paths 125, 135, 145 . . . 155 each of which extends through a series combination comprising an asymmetrically-conducting diode element and a resistor to the base or input electrode of one of the driven logic circuits 160, 170, 180 . . . $n_2$.

Thus, for example, the output path 125 is connected to the cathode electrode of a diode 126 whose plate electrode is connected through a resistor 127 to the base electrode of a transistor 168 of the first driven logic circuit 160.

Also coupled to the input of the first driven logic circuit 160 is the first driving logic circuit 120. Similarly, the driven logic circuits 170, 180 . . . $n_2$ are respectively driven by the logic circuits 130, 140 . . . $n_1$.

The function which the diodes 126, 136, 146 . . . 156 perform in the system of FIG. 1 can be clearly understood if it is assumed for the moment that each of the diodes is replaced by a short circuit and, further, that the pattern of signals applied to the inputs of the driving logic circuits 110, 120, 130, 140 . . . $n_1$ is such as to cause conduction in all of the transistors thereof except the transistor 128 of the logic circuit 120. Such a pattern of input signals causes only the transistor 168 of the driven logic circuits 160, 170, 180 . . . $n_2$ to conduct. As a result, the signals appearing on output leads 163, 173, 183 . . . 153 are "1," "0," "0" . . . "0," respectively.

In the absence of the diode 126 in the output path 125 of the logic system of FIG. 1, interaction currents would flow, in the directions indiacted by the dashed lines, from the positive bias sources respectively connected to the base electrodes of the nonconducting transistors of the driven logic circuits 170, 180 . . . $n_2$ to drive the base electrode of the conducting transistor 168 of the first driven logic circuit 160 toward a more positive potential with respect to ground. These interaction currents may, depending on the number of driven logic circuits and the tolerances of the system, be capable of driving the base electrode of the transistor 168 sufficiently positive to cause the level of conduction in the transistor 168 to fall below a preassigned value, in which case the driving capabilities of the circuit 160 with respect to other logic circuits (not shown) would be impaired. Or these interaction currents may cause the transistor 168 to stop conducting altogether, in which case an incorrect pattern of signals, viz., "0," "0," "0" . . . "0" would appear on the output leads 163, 173, 183 . . . 153, respectively.

The above-specified interaction currents may be blocked from flowing to the point 166 connected to the base electrode of the transistor 168 by including in the output path 125 the diode 126, which, as seen in FIG. 1, is properly poled to prevent the flow therethrough of the undesired interaction currents, thereby insuring reliable operation of the logic system including the circuit 160.

Similarly, the output paths 135, 145 . . . 155 include therein the isolating or blocking diodes 136, 146 . . . 156, respectively, each of which insures that the operation of its associated driven logic circuit is reliable in the case wherein the associated circuit is the only one of the driven logic circuits which is intended to be in a conducting condition.

Thus, a reliable TRL system of the conventional type shown in FIG. 1 includes therein, for the illustrative case of a fan-out of 10, an amplifier having 10 output paths each of which includes an isolating diode.

Advantageously, the potential with respect to ground of the amplifier output terminal 124 should be allowed to go sufficiently negative to vigorously drive all of the logic circuits 160, 170, 180 . . . $n_2$ into conduction, but should not be allowed to go so negative as to cause the transistors of the driven circuits to become so saturated that the recovery or turn-off times thereof become excessive, due, for example, to minority-carrier storage effects in the base regions of the transistors.

As the number of driven logic circuits that are coupled to the amplifier output terminal 124 is increased, the equivalent resistor from the terminal 124 to ground decreases, which, in turn, causes the driving voltage available at the output terminal 124 of the amplifier 105 to also decrease during the time in which the amplifier 105 conducts. This decrease, which eventually reaches a point at which insufficient drive is provided to the driven logic circuits 160, 170, 180 . . . $n_2$, may be compensated for by increasing the value of the emitter resistor 109 as the number of circuits driven by the amplifier 105 is increased. The increase in value of the emitter resistor 109 must, however, be selectively made, for, otherwise, the value thereof might be so increased for a particular increase in the number of circuits driven by the amplifier 105 that an excessive drive would be provided to the logic circuits 160, 170, 180 . . . $n_2$, which, as specified above, would deleteriously affect the operation of the described logic system by increasing the recovery or turn-off times of the driven logic circuits.

In a conventional TRL system of the type shown in FIG. 1, the necessity to change the configuration of the amplifier 105, specifically, the value of the emitter resistor 109 thereof, as the fan-out from the amplifier increases, is disadvantageous in that there is thereby increased in effect the number of invariant basic building block circuits which must be made available for the design of such a logic system.

The TRL system depicted in FIG. 2 illustratively embodies the principles of the present invention. The illustrative system differs from the one shown in FIG. 1 and described above in that in the system of FIG. 2 the output paths emanating from the amplifier 105 do not include therein isolating diodes, in that the amplifier output terminal 124 of the system of FIG. 2 has connected thereto a variable clamping circuit, and in that the system of FIG. 2 includes (in place of the emitter resistor 109 shown in FIG. 1) a device for clamping the amplifier output terminal 124 at a predetermined negative potential with respect to ground only during the time in which the amplifier 105 conducts. The significance of these differences is evident by noting that a conventional TRL system including an amplifier having a fan-out of 10 requires 10 isolating diodes, whereas in the specific illustrative TRL system shown in FIG. 2 the diodes are replaced by a variable clamping circuit comprising a single transistor and associated components. Furthermore, in the TRL system of FIG. 2, the configuration of the amplifier 105 including the clamping device need not be changed as the fan-out from the amplifier varies.

The variable clamping circuit 200 of FIG. 2 includes a p-n-p transistor 201 whose collector electrode is connected to the output terminal 124 of the amplifier 105. Also, the collector electrode of the transistor 201 is connected through a bias resistor 203 to a negative source 204 of direct-current power. Connected to the base electrode of the transistor 201 is one end of a base bias resistor 205 whose other end is connected to a positive source 206 of direct-current power. Also connected to the base electrode of the transistor 201 are input resistors 207 and 208 whose left-hand ends are connected to the input leads 111 and 112, respectively.

The configuration of the variable clamping circuit 200 is identical to that of the driving logic circuit 110, and the inputs to each are also identical. Accordingly, whenever the transistor 118 of the driving logic circuit 110 is in a conducting condition, the transistor 201 of the variable clamping circuit 200 also conducts, thereby clamping the output terminal 124 of the amplifier 105 at a slightly negative potential with respect to ground, viz., the collector-to-emitter voltage drop of the transistor 201. As a result, for the case in which the pattern of signals applied to the inputs of the driving logic circuits 110, 120, 130, 140 . . . $n_1$ causes all of the transistors thereof to conduct except the transistor 128 of the logic circuit 120, thereby causing only the transistor 168 of the driven logic circuits 160, 170, 180 . . . $n_2$ to conduct and the resultant signal pattern appearing on the output leads 163, 173, 183 . . . 153 to be "1," "0," "0" . . . "0," respectively, interaction currents do not flow in the output path 125 to interfere with the desired operation of the illustrative logic system. More specifically, currents do flow from the positive bias sources respectively connected to the base electrodes of the nonconducting transistors of the driven logic circuits 170, 180 . . . $n_2$, but these currents are diverted by the slightly negative potential of the output terminal 124 to flow in the direction indicated by the dashed lines of FIG. 2. This slightly negative potential acts as a sink for the currents which would otherwise flow among the driven logic circuits. Since the interaction currents are in this manner diverted to the variable clamping circuit 200, the need for isolating diodes in the output paths 125, 135, 145 . . . 155 is clearly obviated.

The potential with respect to ground of the amplifier output terminal 124 must, when the transistor 106 of the amplifier 105 conducts, become more negative than the slightly negative clamp voltage imposed by the collector-to-emitter voltage drop of the clamping transistor 201. This more negative excursion of the terminal 124 is allowed to take place by automatically disconnecting the variable clamping circuit 200 from the output terminal 124 during the conducting time of the amplifier 105.

The automatic disconnection of the variable clamping circuit 200 derives from the fact that, as specified above, the circuit 200 includes a transistor 201 whose inputs are the same as those to the driving logic circuit 110 which drives the amplifier 105. Accordingly, whenever the transistor 118 of the logic circuit 110 is turned off, thereby turning on the amplifier 105, the transistor 201 of the variable clamping circuit 200 is also turned off, thereby allowing the potential of the output terminal 124 to be determined solely by a clamping device 220 which is connected between the amplifier output terminal 124 and ground. Advantageously, the device 220 may be a voltage regulator diode of the reverse breakdown type.

When the driving logic circuit 110 and the clamping transistor 201 are turned on, thereby turning off the transistor 106 of the amplifier 105, the amplifier output terminal 124 is clamped at a slightly negative potential which is insufficient to break down the diode 220. Under such conditions, the diode 220 represents essentially an open circuit.

On the other hand, when the driving logic circuit 110 and the clamping transistor 201 are turned off, the amplifier 105 is turned on. Under these conditions, a breakdown current flows through the clamping or limiting device 220 through the resistor 203 to the source 204 and, also, through the transistor 106 and the resistor 122 to the source 123, thereby establishing the constant breakdown voltage of the diode 220 as the invariant driving potential of the amplifier output terminal 124 during the time in which the amplifier 105 conducts. The diode 220 is selected to possess a breakdown voltage of a value which causes a predetermined level of conduction in each of the driving logic circuits, viz., a level that insures that the driven logic circuits 160, 170, 180 . . . $n_2$ will be vigorously turned on, but which at the same time insures that they will not be overdriven.

An illustrative set of values for the components of one of the identical logic circuits included in the system shown in FIG. 2, for example the logic circuit 110, is as follows: resistors 114 and 115—each 3650 ohms; resistor 116—32,400 ohms; positive source 117—12 volts; resistor 119—1330 ohms; and negative source 121—12 volts. Additionally, illustrative values for the components 122 and 123 of the amplifier 105 are 187 ohms and 12 volts, respectively, and the clamping device 220 may be a Western Electric type 1N675 voltage regulator diode.

In an illustrative TRL system of the type shown in FIG. 2, the maximum expected fan-out from the high fan-out stage including the amplifier 105 may in a particular case be less than the full fan-out capabilities of the stage. In such a case the over-all speed characteristics of the system may be improved by adding a padding or emitter resistor in parallel with the diode 220, the value of the resistor being selected so that, for the assumed condition in which the maximum expected fan-out from the amplifier 105 actually exists, the equivalent resistance between the output terminal and ground approximately simulates the resistance value which would exist therebetween if the output terminal 124 of the amplifier 105 were loaded to its full fan-out capabilities. For example, for a logic circuit of the general type of the circuits 110, 200, 120, 130, 140 . . . $n_1$, 160, 170, 180 . . . $n_2$ shown in FIG. 2, and having a fan-in of, say, 4, and, therefore, a full fan-out capability of 27, a 196 ohm emitter resistor would improve the switching characteristics of a logic system in which the maximum expected fan-out is 3 through 6. If the maximum expected fan-out is 7 through 11, 12 through 17, or 18 through 21, a corresponding emitter resistor of 274, 464, or 825 ohms, respectively, is helpful. If, however, the maximum expected fan-out is greater than 21, an emitter resistor in parallel with the diode 220 does not result in any significant speed advantage and may, therefore, be omitted.

It is noted that a copending application of L. Hasdorff, Serial No. 53,303, filed August 31, 1960, is directed to a logic system which is related to the one disclosed herein.

It is to be understood that the above-described arrangements are only illustrative of the application of the principles of the present invention. Numerous other arrangements may be devised by those skilled in the art without departing from the spirit and scope of the invention.

What is claimed is:

1. In combination in a transistor resistor logic system, a plurality of driven logic circuits, a high fan-out amplifier having an output terminal, means coupling said output terminal to each of said plurality of circuits, at least one driving logic circuit respectively coupled to each of said plurality of driven circuits, first means for clamping said output terminal at a first predetermined voltage only when said amplifier is in a nonconducting condition, and second means for clamping said output terminal at a second predetermined voltage only when said amplifier is in a conducting condition.

2. In combination in a transistor resistor logic system, a high fan-out amplifier having an output terminal, driving logic circuit means for causing said amplifier to assume a nonconducting condition whenever said logic circuit means is in a conducting condition and for causing said amplifier to assume a conducting condition whenever said logic circuit means is in a nonconducting condition, first means for clamping said output terminal only during the nonconducting condition of said amplifier, and second means for clamping said output terminal only during the conducting condition of said amplifier.

3. A combination as in claim 2 wherein said second clamping means includes a reverse breakdown diode connected to said output terminal.

References Cited in the file of this patent

UNITED STATES PATENTS 2,861,239 Gilbert ---------------- Nov. 18, 1958

FOREIGN PATENTS 1,182,913 France ------------------ July 1, 1959